US008542673B2

(12) United States Patent
Caughey

(10) Patent No.: US 8,542,673 B2
(45) Date of Patent: Sep. 24, 2013

(54) MULTIMEDIA INTERACTIVE TELEPHONY SERVICES

(75) Inventor: David A. Caughey, Ottawa (CA)

(73) Assignee: CounterPath Corporation, Vancouver, BC ( * ) Notice: Subject to any disclaimer, the term of this patent is extended or adjusted under 35 U.S.C. 154(b) by 1239 days.

(21) Appl. No.: 12/290,662

(22) Filed: Oct. 30, 2008

(65) Prior Publication Data

US 2009/0147774 A1 Jun. 11, 2009

Related U.S. Application Data

(60) Provisional application No. 61/001,274, filed on Oct. 30, 2007.

(51) Int. Cl.
*H04L 12/66* (2006.01)
(52) U.S. Cl.
USPC .......................................... 370/352
(58) Field of Classification Search
None
See application file for complete search history.

(56) References Cited

U.S. PATENT DOCUMENTS

| 6,594,484 | B1 * | 7/2003 | Hitchings, Jr. ............. 455/414.1 |
| 2002/0034289 | A1 * | 3/2002 | Pershan ................... 379/207.02 |
| 2007/0233901 | A1 * | 10/2007 | Kuan et al. .................... 709/246 |

\* cited by examiner

*Primary Examiner* — Chi Pham
*Assistant Examiner* — Kouroush Mohebbi
(74) *Attorney, Agent, or Firm* — Lumen Patent Firm

(57) ABSTRACT

In a multimedia interactive telephony system, a voice service server generates dynamic content intended for consumption by a communication device. The dynamic content is sent to a gateway where it is transformed from to an intermediate content format appropriate for rendering at the communication device. The user may interact with the transformed dynamic content rendered on the communication device, causing the arguments to be sent to the voice server, thus allowing user interactivity with the voice service. The voice services server may also generate dynamic content for simultaneous consumption by multiple communication devices, each of which may independently render an intermediate content format appropriate to it. The voice services server may also generate the dynamic content for the communication device while the communication device is not currently engaged in an active call.

1 Claim, 3 Drawing Sheets

MULTIMEDIA INTERACTIVE TELEPHONY SERVICES

CROSS-REFERENCE TO RELATED APPLICATIONS

This application claims priority from U.S. Provisional Patent Application 61/001,274, filed Oct. 30, 2007, which is incorporated herein by reference.

FIELD OF THE INVENTION

The instant invention generally relates to Internet telephony, and more specifically to systems and methods of extending services to include interactive visual user interface elements.

BACKGROUND OF THE INVENTION

During the last several years Internet telephony systems or, voice over IP (VoIP), have become feasible as a result of a maturing standards base, including ITU standard H.323 and the IETF standard RFC 3261, otherwise known as the Session Initiation Protocol (SIP).

Other non-SIP protocols have greatly extended the use of VoIP, most notably Skype with its proprietary protocol, but also through applications such as Google Talk using standardized XMPP/Jingle, and AOL's AIM Phoneline.

SIP, Skype, Jingle, and telephones (including mobile and BlackBerries) are hereby collectively known as communications devices.

The main attraction associated with VoIP is the potential to use the massive, free-market Internet infrastructure in lieu of tightly regulated legacy telephony infrastructure. The key difference is that Internet service charges are determined by the aggregate bandwidth consumed between the customer and Internet Service Provider, whereas the traditional telephony charges are based on geographic distance between parties.

With the availability of scalable low-cost Internet service provision now ubiquitous in all offices, and most homes, the ability to layer voice communications over existing IP traffic means that companies and individuals can pay for the data capacity to their Internet Service Provider (ISP) only, without regard for where the terminating party is located.

An additional attraction of VoIP is the ability to offer voice services or applications via software servers external to traditional private branch exchanges (PBX's), meaning that additional services can be offered to customers or integrated with other software applications without requiring additional or new hardware.

However, one characteristic of a voice service, accessed via a VoIP or traditional telephone is that the interaction with the service is limited to the audio domain. More specifically, the user is able to hear instructions, prompts, messages or other audio data, and is able to control the service via the keypad or voice recognition. Keypad interaction generally either injects DTMF tones into the audio (in-band), or sends a control signal (out-of-band) via a standard protocol such as RFC 2833, or both.

The combination of audio for output, and voice recognition and/or DTMF for input defines the telephone user interface (TUI).

Use of DTMF generated by a VoIP or traditional telephone's keypad enables the user to navigate through an interactive voice response (IVR) service, but limits the control to the twelve keys found on most keypads (0 to 9, plus '*' and '#'). Some telephones (e.g., Mitel 5340) offer additional programmable "soft keys" that can be mapped to service-specific functionally, but the soft keys typically use proprietary protocols that are only understood by a limited number of PBX's.

Presenting the user with lists of items in a voice service is a particularly difficult task for a TUI, in that selection of items from lists requires mapping keys to items, yet the items may not be readily describable via audio. An example is selecting a one of several voicemails to play. To do this, a voice service must be able to audibly identify a voicemail and map it to a telephone keypad button. However, the number of voicemails may be greater than the number of available keys. Additionally, a voicemail is not readily described in audio. Characteristics that could be used to identify a voicemail of interest might include; the caller's identification (typically a destination ID, or, DID), the caller's display name, the time of the call, and the duration of the voicemail.

The most relevant bit is of information is frequently, but not always, the caller's DID or display name. The former is time-consuming to read out (e.g., "1" "6" "1" "3" "5" "5" "5" "1" "2" "3" "4") and may not be immediately recognizable to the user. The latter can be very difficult for a service to read in a manner that will mean anything to the user (e.g., a telephone carrier may have assigned John and Jane Doe a call display of "DOEJANDJ").

Similarly, other voicemail characteristics such as date and duration, suffer from the fact that it may take more time to listen to the description of the message than it takes to actually listen to a short message.

Consequently, most telephone services present a list of items one item at a time, and the user has the opportunity to interact with each list item before proceeding to the next. However, such sequential presentation means that a user must potentially listen to the description and/or options associated with many items before encountering one of interest. The voice service developer is intrinsically constrained in the options that he can present to the user, and voice services have had to limit input to such data that can be expressed via the 12 DTMF digits, or awkwardly via the letters commonly printed on the keypad (i.e., the "2" key has "ABC", the "3" key has "DEF", the "4" key has "GHI", etc.). However, the common "Directory" or "Dial-by-Name" feature of a PBX reveals this to be a generally unsatisfying way to enter data.

Short Messaging Service (SMS) users are familiar with using a mobile telephone keypad to type text by rapidly and repeatedly pressing a specific digits to cycle through to a stack of letters, number and symbols associated with a specific key ("2" yields "A", "22" yields "B", "222" yields "C", etc.). However, this method is not suitable for a voice service as DTMF can only represent 16 possible characters (the digits 0 to 9, "*", "#", and four additional reserved keys).

Voice recognition offers greater flexibility for input, but is still an emerging technology that requires extensive training and/or programmer-defined dictionaries, and still appears to be susceptible to speaker dialects and accents, subject matter vernacular and unusual target names. Additionally, natural language speech is very open-ended—users frequently utter speech that is not anticipated by the developers of a voice service, with the result that utterances that are logical to the user are unrecognizable to the service, leading to a frustrating user experience. The continual effort to accommodate regional and personal differences in vocabulary and speech patterns is an enormously expensive proposition for a service developer, and requires expertise that is probably not held by the service developer.

Furthermore, unpronounceable texts (such as passwords) are poor candidates for voice recognition.

SUMMARY OF THE INVENTION

In one aspect, the present invention provides a multimedia interactive telephony system having a voice service server, an access aggregation network connected to the voice service server, and at least one communication device connected to the access aggregation network. The voice service server generates dynamic content intended for consumption by the communication device and uses a first protocol to send the dynamic content to a gateway in the access aggregation network where it is transformed from the first protocol to a second protocol understood by the communication device. The second protocol used by the communication device includes an intermediate content format appropriate for rendering the transformed dynamic content at the communication device and displaying it to a user.

The second protocol used by the communication device may include any of various protocols such as TDM telephony, SIP, Skype, XMPP/Jingle, Mitel MiNet, SIP/SIMPLE, XMPP, MSNP, YMSG, HTTP, or SOAP. The dynamic content may include arguments that uniquely identifying an action. User interaction with the transformed dynamic content rendered on the communication device then causes the arguments to be sent to the voice server, thus allowing user interactivity with the voice service. The voice services server may also generate dynamic content for simultaneous consumption by multiple communication devices, each of which may independently render an intermediate content format appropriate to it. For example, the dynamic content may include an invitation to join a conference bridge previously established with the voice service server. In addition, the voice services server may generate the dynamic content for the communication device while the communication device is not currently engaged in an active call. These and other advantageous features will be described in detail below with reference to the drawing figures.

DETAILED DESCRIPTION

Figure 1:
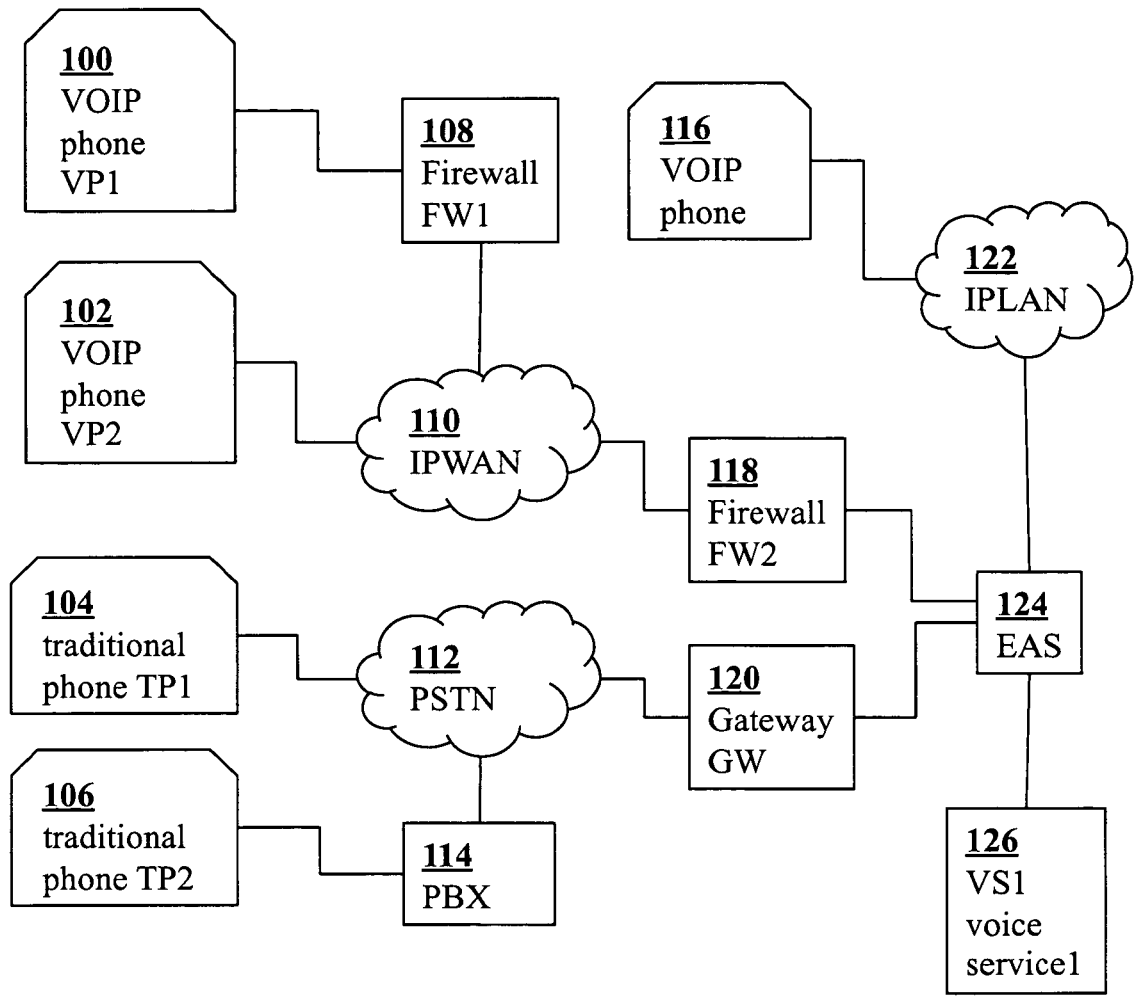
FIG. 1 is a schematic diagram illustrating an internet telephony system according to an embodiment of the present invention.

In one aspect, the present invention provides techniques to extend the TUI to include additional input devices such as a mouse or other pointing device for selecting or clicking, and a keyboard (either physical as in a computer or RIM BlackBerry, or virtual as in an Apple iPhone) for entering text, or other such input devices such as a mobile phone supporting SMS data entry.

In most existing voice services, a characteristic of a TUI is dynamic in that the options change from moment to moment as the user interacts with the service. For example, while listening to a voicemail, the relevant options may include repeating, deleting, or forwarding the message. But once a message has been deleted, the relevant options may include playing the next message, changing the outgoing greeting, etc.

Similarly, in a typical attendant IVR, the first choices include the desired department (e.g., Sales or Technical Support), and if the user chooses Technical support he must then choose between the enumerated product families (e.g., Desktops, Laptops, Printers), and if the user then chooses "Laptops" must choose the product line (e.g., Business or Home), etc.

The dynamic nature of the relevant options means that the user must usually wait for most if not all IVR choices to be offered before he knows which key to press to proceed to the next step, or undertake the desired action. This process of waiting and listening before choosing must be repeated with each step through an audio-only voice service. Experienced users are able to navigate an IVR much more quickly as they will have memorized actions or key sequences, but are susceptible to unexpected results if the service options ever change.

Accordingly, some embodiments of the present invention present TUI options visually as well as audibly, as users are capable of reading much faster than the options can be spoken. In addition, some embodiments of the present invention allow the user to click on visually presented options, as an alternative means of causing navigation changes. For example, a graphical user interface (as used in a web form, Microsoft Window or Macintosh application, a Google "widget", etc.) offers much broader interactivity choices including labels, buttons, alerts and message boxes, text fields, selectable and sortable tables, drop lists, etc. Other interfaces include text messages, as will be described in more detail below.

Accordingly, some embodiments of the present invention are able to present the list items visually, thereby allowing a user to use all available data to identify items of interest. A user can select an arbitrary member of a list—effectively skipping forward or back in a manner not otherwise possible in a TUI. Some embodiments of the present invention provide a means by which list items can be sorted and or filtered to maximize the ability of a user to find and deal with list items of interest. Some embodiments of the present invention extend the TUI, and present more items than can be associated with the telephone keypad.

In order to associate generic functionality with GUI elements, the voice service includes sufficient context to effect the desired outcome when the GUI element is invoked.

Accordingly, some embodiments of the present invention bind an interactive GUI element to a parameterized HTTP server request, so that interaction with the GUI element (e.g., by a mouse click) results in a call to an appropriate server.

The collection of text, presentation suggestions, and possible interaction bindings that is relevant to a particular call into a particular voice service at a particular instant in time, as generated by the voice service, is defined herein as "dynamic content".

Additionally, all current voice services are associated only with an active call on a voice device, initiated typically by a call from the device into a server or PBX, but occasionally by a call from the server or PBX to the device (e.g., hotel wake up calls, automatic warranty notice reminders, and library overdue notices). This is a necessary constraint of a TUI that relies on audio to input and output information—if there is no active call, there can be no audio, and therefore no information exchange.

However, if the existence of an audio stream is not required, due to alternative input and output media streams, it would enable the creation of services that interacted with a user who was not currently engaged in an active call. For example, a GUI could be presented when a specified group of people's presences indicate they are all available, and might offer the user an option to instantly initiate a conference call with all the specified people being called in. Or, a GUI could be presented when the first participant joins the user's scheduled conference call, and might offer the user the option to connect as the conference moderator. Or, a GUI could be presented when a person is leaving a voicemail, and might offer the ability to block all subsequent calls from that particular caller. However, as with more traditional voice services, the content is inherently dynamic.

Applications that monitor activity (e.g., loss of wireless service from a WiFi-enabled mobile phone) and/or implement third-party call control without requiring an audio stream should not, strictly speaking, be called "voice" services. Nevertheless, because such services frequently relate to or enable activity on communications devices, they will continue to be considered as voice services.

Accordingly, some embodiments of the present invention allow voice services to generate dynamic content that can be presented to the user via a GUI to the user, even in the absence of an audio connection. Additionally, it is relevant that not all sources of dynamic content need to be PBX's, for example, a server could interact with a mobile network operator to ascertain the status of a mobile subscriber, and generate dynamic content based on transitions in the status.

Most traditional communications devices are incapable of rendering a dynamic graphical user interface. However, some soft phones such as CounterPath Bria, are capable of rendering dynamic content, thereby exposing an interactive GUI directly within the communications device.

Additionally, web services—including Google "widgets", Yahoo! "pipes" as well as custom web application—are capable of interacting with a possibly remote voice server and retrieving the dynamic that are relevant to one or more calls (even though they may not support audio). The dynamic content may be retrieved via proprietary remote procedure calls (RPC's), SOAP, HTTP, or other such methods. These web services can then render the dynamic content, and the interaction is not through the communications device, but with an application that extends the communication device's user interface.

The ability of web services to present different GUI under different contexts is well known in the art (e.g., a web interface to a conference server can list the participants, and allow a moderator to mute participants, start or stop recording, terminate the conference, etc.) However, such web services are usually tightly coupled to the underlying voice service, and as such are single-purpose GUI's.

Dynamic content offers a means by which a voice service generates the information about what is relevant at any given point in any service such that any web service that can render dynamic content is therefore able to present GUI in the manner best suited to the medium. This applies even to voice services that were unknown at the time of creation of the dynamic content capable web service.

Additionally, some communications devices (e.g., Google Talk and CounterPath Bria) have built-in support for instant messaging. The dynamic content generated by the voice service can therefore be rendered by the server into instant messages. Similarly, the user can send instant messages back to server, which can interpret them and turn them into events that influence the voice service. In this case, a server can act as a bridge between the voice service generating the dynamic content, and a communication device incapable of native rendering of dynamic content.

Different instant message protocols and clients are capable of different levels of text formatting. For example Google Talk supports only plain text, whereas CounterPath Bria supports full HTML formatting and styling of messages. A bridge server therefore can render dynamic content as plain text or HTML, depending on the support offered by the communication client.

Furthermore, if the instant message client supports HTML chat, or can in some manner render hyperlinks, then specific interactions can be encompassed in a URL, that, when clicked, causes the server to parse the URL and initiate the specified action or event.

Because an audio connection is not required to for dynamic content to be relevant, it is possible to have multiple communications devices that simultaneously render dynamic content, with different content rendering capabilities. For example a user may have both a CounterPath Bria capable of HTML instant messaging via a bridge, as well as a Google widget capable of full-GUI rendering.

Accordingly, some embodiments of the present invention define an intermediate interaction format that separates the process of generating dynamic content from the process of rendering the dynamic options.

Changes to the dynamic content can be pushed to a client, via notification methods (e.g., Subscribe and Notify, SIP info messages, or other such protocol-specific methods) or by other means such as maintaining open AJAX connections. If the client is not capable of having dynamic content pushed to it, it can poll for updates.

Accordingly, some embodiments of the present invention associate a recency indicator (e.g., a timestamp or sequence number) with dynamic content, so that more recent content can be rendered in place of older content.

It is an advantage of the instant invention that the system and method for generating multi-media interactive voice services extends the interactions possible via a traditional audio-only communications device.

In accordance with an aspect of the instant invention there is provided a communication system such as shown in FIG. 1. The system includes a software server 126 providing voice services to communication devices such as devices 100, 102, 104, 106 connected to the server 126 via an access aggregation network, typically an Internet protocol wide area network or local area network (IP WAN/LAN) but also possibly over the public subscriber telephone network (PSTN).

The communication devices may be capable of a one of several communication protocols including possibly voice protocols (e.g., TDM telephony, SIP, Skype, XMPP/Jingle, Mitel MiNet or others) as well as possibly instant messaging protocols (SIP/SIMPLE, XMPP, MSNP, YMSG), as well as possibly other communication protocols for exchanging data with servers (e.g., HTTP, SOAP or other RPC's).

In accordance with another aspect of the instant invention the server comprises software interfaces capable of bi-directional communication with the communication devices via a possibly one of several media formats including audio, instant messaging, or others supported by the communications devices, which may include use of a possibly third-party gateway to transform signals and data from a protocol understood by a communication device to and from a protocol understood by the server.

For example, TDM data transmitted over a T1 link to the PSTN may be converted to and from SIP signalling and RTP data via a media gateway, or MSN instant messages may be converted to and from XMPP via a Jabber gateway.

In accordance with an aspect of the invention the software server is capable of responding to events raised in accordance to signaling or received media, and that these events may be used to effect transitions in a voice service possibly implemented in a service logic execution environment (SLEE) or other such model.

In accordance with another aspect of the invention, the voice service is capable of generating content for consumption by the user via a communication device. The generated content can either be constant for all calls in a particular service, can be specific to a single call into a specific service, or can additionally reflect the current context of a single call into a specific service as the user interacts with the voice service via the communication device. The term "generated dynamic content" will be used to describe all such cases.

In accordance with another aspect of the invention, the generated dynamic content can be as simple as generating textual equivalents of currently playing audio prompts, but can also include the generation of more complex GUI elements.

In accordance with an aspect of the invention there is provided a specification that defines a set of GUI elements as an intermediate format between the voice service and the communication device that a communication device can then interpret and display in a manner appropriate to the communication device, and that this format includes but is not limited to labels, actions or buttons, list elements, alerts, confirmations, and prompts.

In accordance with another aspect of the invention multiple communication devices can consume the generated dynamic content simultaneously, with each device capable of independently rendering the intermediate format of the generated dynamic content.

In accordance with an aspect of the invention there may be provided voice services that are not associated with specific calls into or out of the server. These services are capable of generating dynamic content for consumption by communication devices that monitor such content.

In accordance with another aspect of the invention there is provided a means by which a possibly authenticated communication device can request the generated dynamic content relating to a specific user, call, communication device, or other service.

In accordance with another aspect of the invention there is provided a means by which a possibly authenticated communication device can subscribe to the generated dynamic content relating to a specific user, call, communication device, or other service; and therefore obviate the need to periodically request the generated dynamic content.

In accordance with an aspect of the invention, there is provided a means by which generated dynamic content can be sequenced, such that generated dynamic content received via request or subscription can be determined to be obsolete.

In accordance with an aspect of the invention, there is provided in the generated dynamic content arguments that can be used to uniquely identify an action or other input such that a user interaction with the rendered generated dynamic content can cause such arguments to be sent (possibly via HTTP, SOAP, or other RPC methods) to the server. There is further provided a means by which the server can detect and parse such arguments and route them to the appropriate voice service.

In accordance with another aspect of the invention, there is provided a means by which a voice service can specify an argument such that user interaction with the rendered generated dynamic content or other input can be routed a specific voice service.

In accordance with another aspect of the invention, there is provided a means by which arguments associated with obsolete dynamic content may be detected as such, and possibly ignored or reported as such via further generated dynamic content.

In accordance with another aspect of the invention, the arguments included in the generated dynamic content can allow for interactions that are not otherwise possible in a TUI due to limitations associated with DTMF or voice recognition.

In accordance with an aspect of the invention, there is provided a means by which the server can act as an intermediary consumer of generated dynamic content for the purpose of rendering content in a manner appropriate to a communication device when the communication device is not itself capable of receiving or rendering generated dynamic content, or when other factors make it desirable for the server to act as the intermediary consumer and renderer of generated dynamic content.

In accordance with another aspect of the invention, the server is able to use database records, bandwidth analysis, licensing, SIP headers or other such domain knowledge to determine which rendering format is most appropriate to a particular device, which may include HTML (and possibly AJAX via the Google Web Toolkit or Laszlo, Microsoft NET or other such web application toolboxes), Macromedia Flash, or instant messaging via a variety of protocols in plain text or HTML.

In accordance with another aspect of the invention, when acting as an intermediary consumer and renderer of generated dynamic content for an instant messaging enabled communications device, there is provided a means by which the server can also receive instant messages from the user, and interpret these as additional inputs to a voice service.

In accordance with another aspect of the invention, the generated dynamic content can include instructions to the user for interacting via instant messaging.

In accordance with another aspect of the invention, when acting as an intermediary consumer and renderer of generated dynamic content, and receiver of instant messages from the user, the voice service is able to act on commands and inputs that cannot be specified in a TUI due to the limitations of DTMF and voice recognition.

In accordance with an aspect of the invention, the voice service is able to incorporate knowledge about the user or server including possibly licensing to control the amount of generated dynamic content, including but not limited to possibly adding content related to purchasing or licensing of extended or related capabilities associated with a user or server, or reminders of the limits of a user's or server's current license.

In an additional aspect of the invention, the system allows service to be initiated by a communication device not currently using the service. For example, after a user A establishes a conference bridge, other users can join the conference bridge of user A, who will receive information that the other users joined service in the cloud.

In accordance with an aspect of the invention, service notification can be sent to a communication device via standard IP protocols (HTTP, SOAP, SIP, SIMPLE, XMPP, etc) to inform a user of the communication device about available service and simplify accessing the service.

Service notification sent via standard IP protocols, based on context, can be transformed into legacy TDM voice/video call or SMS/MMS message.

Embodiments of the instant invention will now be described in conjunction with the following drawings.

FIG. 1 displays a schematic diagram illustrating an internet telephony system including connections and interactions between a voice server connected over a network to a variety of communications devices.

A typical call into a voice service 126 is initiated from the any number of VoIP communication devices such as 100 VP1, and is routed via a VoIP protocol such as SIP through a firewall 108 (FW1) and the access aggregation network, typically an internet protocol wide area network 110 (IPWAN) through a firewall 118 (FW2) to a voice application server 124 (EAS). The EAS 124 then internally routes the call to a voice service 126 (VS1).

Another typical call into a voice service is initiated from a VoIP communication device 102 (VP2) directly connected to the IPWAN 110 whereupon it is routed through FW2 118 to the EAS 124, which then internally routes the call to VS1 126.

Another typical call into a voice service is initiated from a VoIP communication device 116 (VP3) in the same internet protocol local area network 122 (IPLAN). This call may be directly routed to the EAS 124, which then internally routes to VS1 126.

Another typical call into a voice service is initiated from a non-VoIP communication device 104 (TP1) which may or may not be a mobile device, and which is connected to the public subscriber telephone network 112 (PSTN) by a telephony carrier. This call is routed through the PSTN 112 to a media gateway 120 (GW), which converts the call to a protocol such as SIP that is understood by the EAS 124. The EAS then internally routes the call to VS1 126.

Another typical call into a voice service is initiated from a non-VoIP communication device 106 (TP2) that is behind a private branch exchange 114 (PBX) or other phone switch. The PBX 116 routes the call to the PSTN 112, and then through the GW 120 to the EAS 124, which then internally routes the call to VS1 126.

Calls initiated by the voice service VS1 126 to communication devices 100, 102, 116, 104, or 106 (i.e., VP1, VP2, VP3, TP1 or TP2, respectively) generally follow the paths back to the communications devices that are the reverse of calls initiated from the communication devices (VP1, VP2, VP3, TP1 or TP2).

Figure 2:
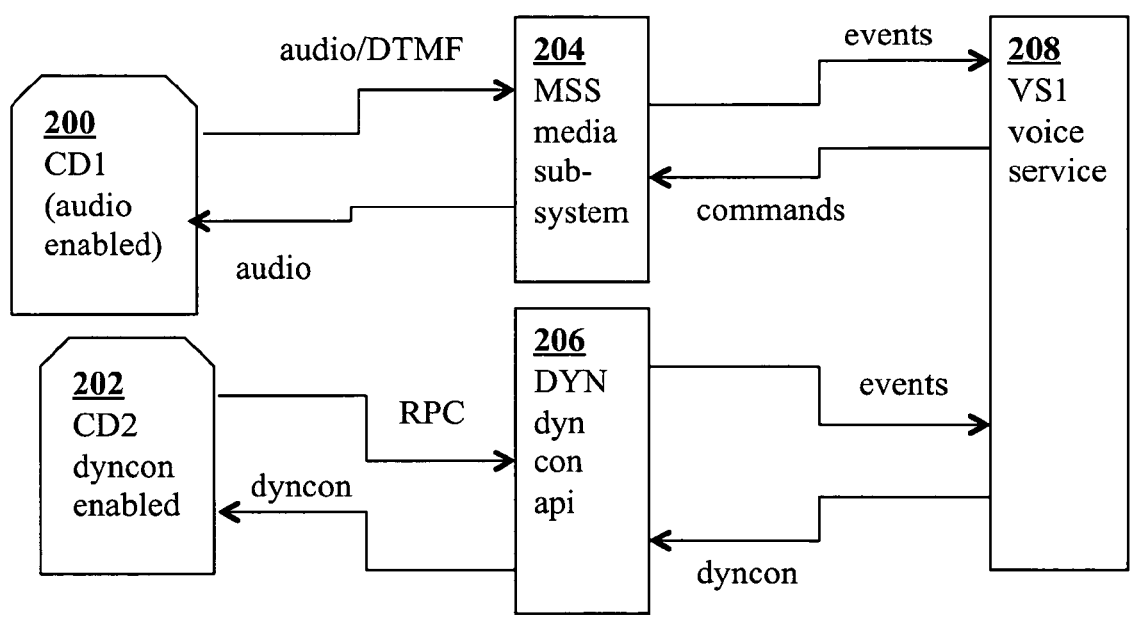
FIG. 2 is a schematic diagram illustrating interactions between communication devices and a voice service in accordance with an embodiment of the present invention.

FIG. 2 displays a schematic diagram illustrating the ways that communication devices can interact with a voice service related to the implementation and use of multi-media interactive voice services in accordance with an embodiment of the instant invention.

A call from an audio communication device CD1 200 is routed through to a voice service 208 (VS1) as shown in FIG. 1. Information is provided by CD1 200 to a media subsystem 204 (MSS) associated with VS1 208 in the form of audio and possibly out-of-band DTMF. The MSS 204 analyzes the audio and possibly generates events that are used to possibly effect state transitions in VS1 208. VS1 208 may generate commands back to the MSS 204 that generates audio (e.g., playback of recorded messages) that is returned to CD1 200.

A dynamic content enabled communication device CD2 202 is connected to VS1 208 as shown in FIG. 1. Dynamic content generated by VS1 208 is retrieved by or pushed to CD2 202 via a dynamic content application programming interface 206 (DYN). CD2 202 then renders the information in the dynamic content it receives in a manner appropriate to the capabilities of CD2 202. Keyboard, mouse or other input devices used with CD2 202 result in RPC calls to DYN 206, which generate events that are used to possibly effect state transitions in VS1 208.

A single communications device may include both CD1 and CD2, so that it is simultaneously capable of both sending and receiving audio and DTMF, as well as receiving and rendering dynamic content and stimulating events via RPC.

Figure 3:
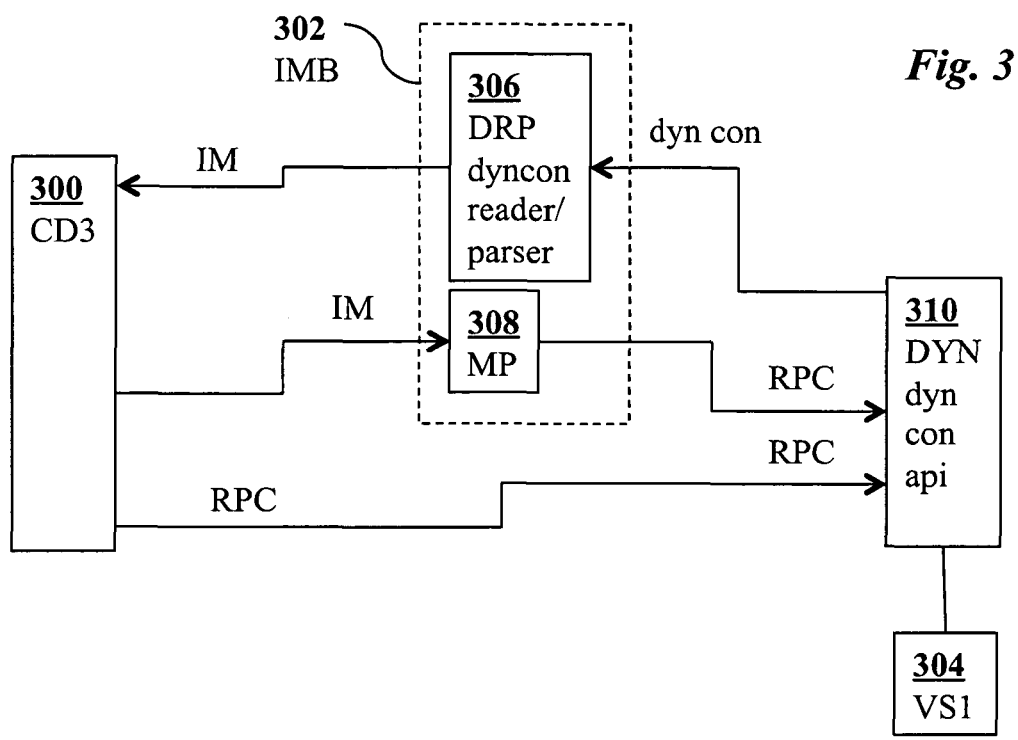
FIG. 3 is a schematic diagram illustrating interactions between communication devices and a voice service using an intermediary consumer and renderer of generated dynamic content to bridge an instant message-enabled communication device with a dynamic content application programming interface in accordance with an embodiment of the instant invention.

FIG. 3 displays a schematic diagram illustrating the way that an intermediary consumer and renderer of generated dynamic content can be used to bridge an instant message-enabled communication device with the Edge Application Server's dynamic content application programming interface (API), thereby allowing control of a voice service via instant messaging services in accordance with an embodiment of the instant invention.

When a communications device CD3 300 that is capable of displaying and generating instant messages via a possibly one of several protocols such as XMPP, MSN, AIM is connected to a voice service 304 (VS1), the dynamic content application programming interface 310 (DYN) may detect the such a capability by inspecting SIP headers, looking in electronic databases, or other such means.

If the device CD3 300 is determined to support instant messaging, the DYN 310 will instantiate an instant message bridge 302 (IMB) comprising a instant message parser 308 (MP) and dynamic content parser/renderer 306 (DRP). The IMB 302 will then initiate an instant message session with CD3 300 in a protocol supported by CD3 300, involving the exchange of instant messages (IM). Thereafter, the IMB 302 will act as a dynamic content enabled communication devices as per CD2 in FIG. 2, capable of generating RPC and consuming dynamic content.

When establishing the instant messaging session, the IMB 302 may identify itself in a manner that is meaningful to the user in the context of the relevant voice service VS1 304, such as "Voicemail" or "Conference Server".

Dynamic content (dyncon) retrieved from DYN 310 is rendered by the DRP 306 into an instant message format that is appropriate to the protocol of the instant message session initiated by the IMB 302, and is sent to CD3 300 where the instant message IM is rendered in a screen element such as a popup, window, or other such mechanism.

A user of device CD3 300 may possibly interact with VS1 304 by composing an instant message to the IMB 302. The IMB 302 parses the message, and generates a corresponding event that is sent to VS1 304 via DYN 310 and may possibly effect a state transition in VS1. In turn, VS1 304 may generate further dynamic content that will be consumed and rendered by the DRP 306.

Some instant messaging protocols and clients will render internet protocol universal resource locators (URL's) in a manner that allows them to be selected or clicked on by a user. For such clients, the DRP 306 can render dynamic content that contacts active elements in a manner such that a generated URL will point to DYN 310, with parameters that will cause events to be sent to the VS1 304 that may possibly effect a state transition therein.

Dynamic content can support language localization by tagging text elements with a language tag (e.g., as defined in RFC 3066 or equivalent). In this manner, the client that renders the dynamic content can, possibly based on user preferences, present the GUI in any one of as many languages as the voice service that generated the dynamic content supports. Alternatively, if the voice service can associate the consumer of dynamic content with a user's language preference, the voice service can restrict the dynamic content to only contain the user's preferred language. It will be well understood those versed in the art that this method also applies to certain non-textual elements that require or benefit from localization, such as icons and images.

The invention claimed is:

1. A method for multimedia interactive telephony comprising:
- receiving by a gateway server dynamic content from a voice services server using a first telephony protocol, wherein the dynamic content comprises arguments that uniquely identify voice services user interface actions; wherein the dynamic content received from the voice services server is generated for simultaneous consumption by multiple communication devices with different content rendering capabilities;
- transforming by the gateway server the dynamic content from a first telephony protocol to a second telephony protocol, and transforming by the gateway server the dynamic content into an intermediate content format appropriate for rendering by a user communication device, wherein the intermediate content format comprises graphical user interface elements corresponding to the arguments that uniquely identify the voice services user interface actions;
- transmitting by the gateway server the transformed dynamic content in the intermediate content format to the user communication device using the second telephony protocol;
- receiving by the gateway from the user communication device an argument corresponding to user interaction with the graphical user interface elements on the communication device;
- transmitting by the gateway to the voice services server the argument corresponding to the user interaction with the dynamic content rendered by the user communication device.

* * * * *